(12) United States Patent
Lagares Gamero et al.

(10) Patent No.: US 12,029,220 B2
(45) Date of Patent: Jul. 9, 2024

(54) COMPACT ORIENTING AND TRANSFERRING DEVICE FOR UNITARY ELONGATED FOOD PRODUCTS AND OPERATING METHOD THEREOF

(71) Applicant: METALQUIMIA, SAU, Girona (ES)

(72) Inventors: Josep Lagares Gamero, Besalú (ES); Federico Scalerandi, Vimercate (IT)

( * ) Notice: Subject to any disclaimer, the term of this patent is extended or adjusted under 35 U.S.C. 154(b) by 71 days.

(21) Appl. No.: 17/912,451

(22) PCT Filed: Mar. 16, 2021

(86) PCT No.: PCT/EP2021/056677
§ 371 (c)(1),
(2) Date: Sep. 16, 2022

(87) PCT Pub. No.: WO2021/185831
PCT Pub. Date: Sep. 23, 2021

(65) Prior Publication Data
US 2023/0148614 A1 May 18, 2023

(30) Foreign Application Priority Data

Mar. 17, 2020 (EP) .................................... 20382201

(51) Int. Cl.
*A22C 11/00* (2006.01)
*B65G 15/16* (2006.01)
*B65G 29/02* (2006.01)
(Continued)

(52) U.S. Cl.
CPC ............ *A22C 11/008* (2013.01); *B65G 15/16* (2013.01); *B65G 29/02* (2013.01);
(Continued)

(58) Field of Classification Search
CPC ...... A22C 11/008; B65G 15/16; B65G 29/02; B65G 47/1464; B65G 47/31;
(Continued)

(56) References Cited

U.S. PATENT DOCUMENTS 3,470,999 A * 10/1969 Snow ..................... B65G 37/00
198/605
3,603,449 A * 9/1971 Snow, III ............... B65G 29/02
198/826
(Continued)

*Primary Examiner* — Mark A Deuble
(74) *Attorney, Agent, or Firm* — Eugenio J. Torres-Oyola; Victor M. Rodriguez-Reyes; Rafael Rodriguez-Muriel

(57) ABSTRACT

Compact orienting and transferring device for unitary elongated food products (1) comprising a circular conveyor (10) surrounded by a limitative wall (11) with an extraction opening (12); an extractor device including an extraction path (31, 32, 33) defined on a first conveyor (21) and with an intake end connected to the extraction opening (12), and a circular wheel (40) including a circular groove (50) on the wheel periphery, the first conveyor (21) being a conveyor belt wider than the circular groove entrance (53), a circular portion of the first conveyor (21) being directly supported on the wheel periphery covering the circular groove entrance (53) on a portion of that wheel periphery, defining a circular portion (32) of the extraction path (31, 32, 33) within the circular groove (50).

17 Claims, 5 Drawing Sheets

(51) Int. Cl.
*B65G 47/14* (2006.01)
*B65G 47/31* (2006.01)
(52) U.S. Cl.
CPC ......... *B65G 47/1464* (2013.01); *B65G 47/31* (2013.01); *B65G 2201/0202* (2013.01); *B65G 2203/0241* (2013.01); *B65G 2203/044* (2013.01)
(58) Field of Classification Search
CPC .... B65G 2201/0202; B65G 2203/0241; B65G 2203/044; B65G 47/252; B65G 2203/0208; B65G 47/2445; B65G 47/32; B65G 47/82
See application file for complete search history.

(56) References Cited

U.S. PATENT DOCUMENTS

| | | | | |
|---|---|---|---|---|
| 3,910,405 | A * | 10/1975 | Couperus | B65G 15/16 198/690.2 |
| 4,446,962 | A * | 5/1984 | Burkhardt | B07C 3/08 198/457.07 |
| 4,757,382 | A * | 7/1988 | Kaziura | B65G 47/684 198/689.1 |
| 4,951,806 | A * | 8/1990 | Schwing | B65G 15/16 198/605 |
| 5,996,769 | A * | 12/1999 | Winchip | B65G 15/16 198/607 |
| 6,155,403 | A * | 12/2000 | Thrasher | B65G 29/02 15/21.2 |
| 9,139,368 | B2 * | 9/2015 | Viilo | B02C 21/02 |
| 2023/0021384 | A1 * | 1/2023 | Schombert | B65G 47/1464 |

\* cited by examiner

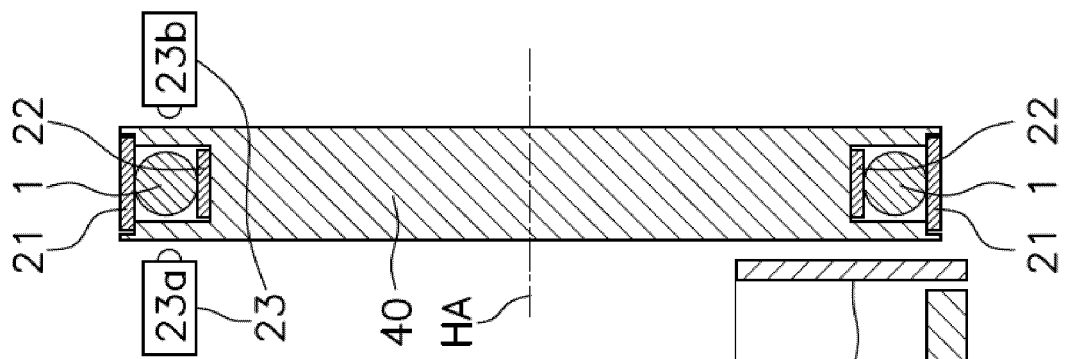
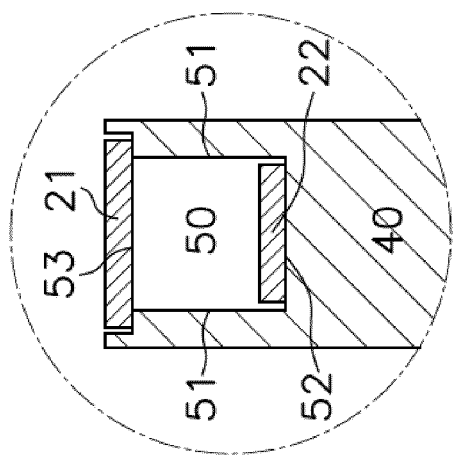
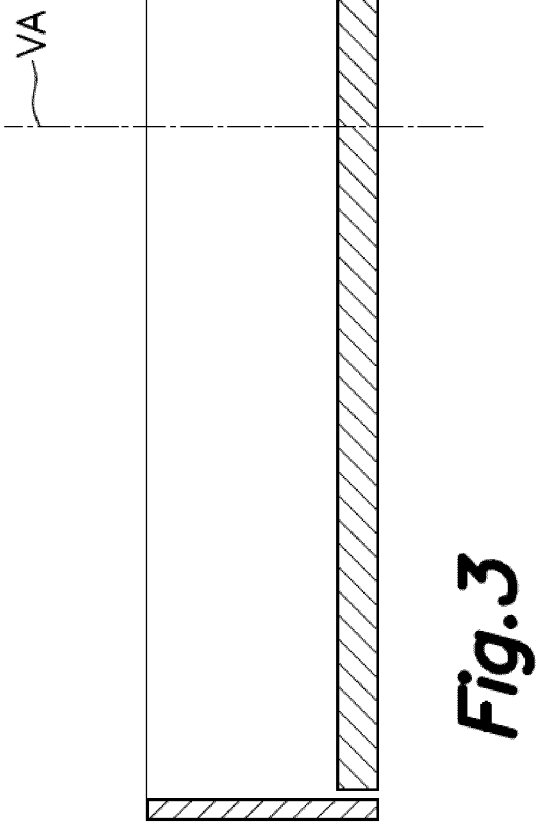

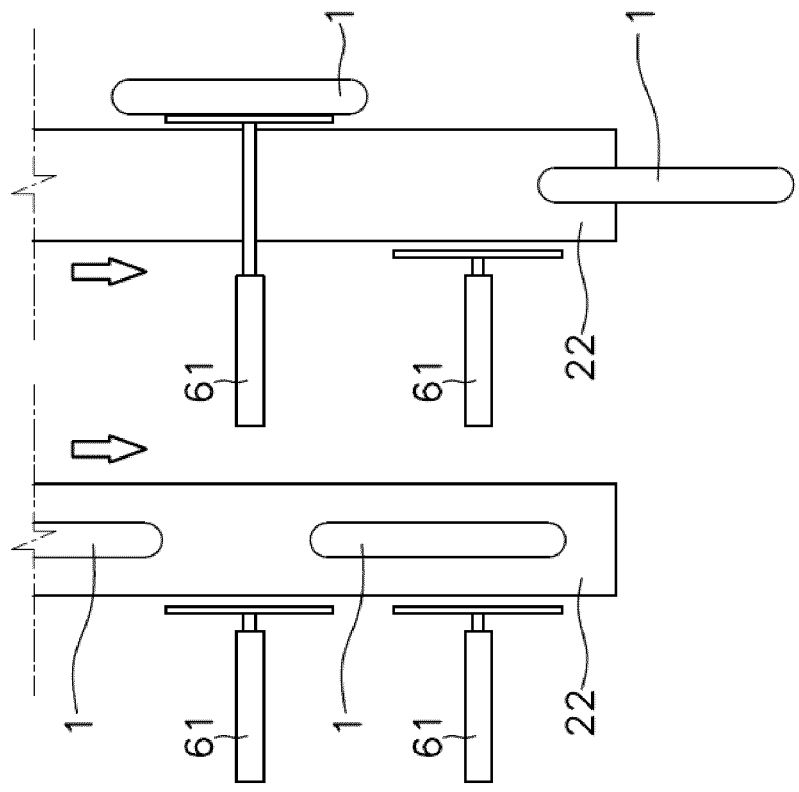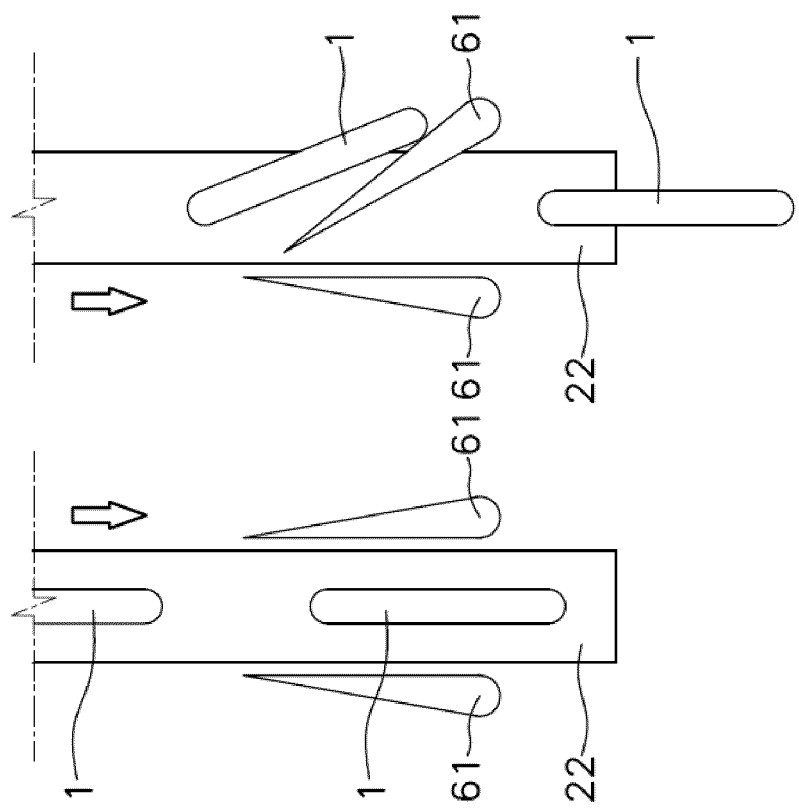

COMPACT ORIENTING AND TRANSFERRING DEVICE FOR UNITARY ELONGATED FOOD PRODUCTS AND OPERATING METHOD THEREOF

TECHNICAL FIELD

The present invention is directed to a compact orienting and transferring device for unitary elongated food products such sausages, frankfurts, snacks, carrots, cucumbers, cookies, energy bars or the like.

The proposed device is a compact device which orient, and transfer said unitary elongated food products.

The present invention is also directed to an operating method of said compact orientating and transferring device.

STATE OF THE ART

The use of a circular conveyor surrounded by a limitative wall with an extraction opening for orienting elongated elements and for feeding an extraction device defining an extraction path is already known from the available state of the art.

For example, document EP0017470 describes an orienting and transferring device for bottles in which the extraction device comprises two parallel conveyor belts facing each other, defining in between a feeding portion of the extraction path tangent to the circular conveyor. The feeding portion of the extraction path convey the bottles to a circular wheel which includes an annular groove where the bottles are introduced, a portion of said annular groove being a circular part of the extraction path. According to this document, the feeding portion and the circular portion of the extraction path are consecutive but does not have continuity on the conveying means, because the conveyor belts of the feeding portion does not extend into the circular portion of the extraction path, and because of that the conveyed product has to be transferred from one conveyor to a different conveyor many times during its transference along the extraction path, and generates many spaces between the conveyors where dirt can be accumulated. When the conveyed product is a fragile product, such as a food product, those transferences from one conveyor to another can produce breakages of the food product, and the hygienic requirements of the food products require an extraction device easily cleanable, with as few nooks as possible.

Furthermore, the extraction device described on this document is not compact because the footprint of the extraction device extends beyond the footprint of the circular conveyor.

U.S. Pat. No. 4,474,197 also describe a circular conveyor associated with an extraction device. In this case the extraction device comprises a circular wheel rotative around a horizontal axis and a first conveyor belt with a portion supported on the periphery of said circular wheel, but in this case the conveyed elements conveyed between a non-movable track placed bellow the conveyed elements, and the conveyor belt placed above the conveyed elements, pressing said conveyed elements against the track to assure enough friction between the conveyor belt and the conveyed element. This solution does not allow the elevation by steep slopes but only by gentle slopes, because only one side of the extraction path is conveying the conveyed elements while the other sides of the extraction path are opposing friction to its movement which can produce breakages of said conveyed product when are fragile.

Documents JP2014105052A, JP2009208963A and GB2552820A describe an orienting and transferring device including a circular wheel with a circular groove and a first and second conveyors partially supported on a peripheric region of said circular wheel, closing a portion of the circular groove for transferring unitary food products.

Documents JPS4829942B1, JP3128669B2 and ITB020110019A1 describe a orienting and transferring device including a circular conveyor surrounded by a limitative wall with an extraction opening.

BRIEF DESCRIPTION OF THE INVENTION

The present invention is directed to a compact orienting and transferring device for unitary elongated food products.

The unitary elongated food products are edible products elongated in a main direction separated in individual units.

The proposed orienting and transferring device comprise, in a manner already known from the available state of the art:

an extractor device including an extraction path with an intake end for receiving unitary elongated food products and an out-take end for delivering said unitary elongated food products;

the extractor device further comprises a circular wheel, rotative around a horizontal axis, defining a wheel periphery and including a circular groove on said wheel periphery defined between two lateral annular walls facing each other and one bottom wall comprised between said two lateral annular walls and facing a circular groove entrance which surrounds the circular wheel; wherein the first conveyor is a conveyor belt wider than the circular groove entrance defined between the two lateral annular walls of the circular groove, and a circular portion of the first conveyor is directly supported on the wheel periphery covering the circular groove entrance on a portion of that wheel periphery, defining a circular portion of the extraction path within the circular groove between the bottom wall of the circular groove and the portion of the first conveyor belt covering said circular groove.

The proposed device comprises an extractor device which includes an extraction path through which the units of elongated food product, are conducted in succession from an intake to an out-take of the extraction path. The out-take is at a higher level than the intake, producing an elevation of the unitary elongated food products during its transference.

The extraction path is defined on a first conveyor. The units of elongated food product extracted from the circular conveyor in said predefined orientation fall on the first conveyor which impels the unitary elongated food products along the extraction path towards the out-take end.

The circular wheel is a vertical wheel rotative around a horizontal axis. Said circular wheel includes on its wheel periphery a circular groove accessible through a circular groove entrance.

The first conveyor of the extraction device is a conveyor belt wider than the width of the circular groove. Said first conveyor includes a portion directly supported on the wheel periphery of the circular wheel, closing the circular groove entrance of the circular groove in a portion of its longitude determining a circular portion of the extraction path.

A portion of the circular groove remains uncovered by the first conveyor, permitting the units of elongated food product to be introduced and extracted from the circular groove through said uncovered portions of the circular groove.

Preferably the circular portion of the extraction path starts at the lowermost point of the circular wheel.

The present invention further comprises, in a manner not known from the state of the art, the following additional features:
- a circular conveyor, rotative in a substantially horizontal plane, defining a conveyor periphery surrounded by a limitative wall, the limitative wall including an extraction opening connected to the intake-end of the extraction path adjacent to the conveyor periphery; and wherein
- the circular wheel and the circular conveyor are coordinated through a control unit to produce the rotative movement of the circular periphery of the circular wheel at a higher velocity than the rotative movement of the conveyor periphery of the circular conveyor.

The circular conveyor is a circular disc or a circular ring which rotates in a substantially horizontal plane around a center actuated by an actuator such a motor. Said circular conveyor define a conveyor periphery which is surrounded by a circular limitative wall. It will be understood that the substantially horizontal plane is a plane horizontal or with an inclination of up to 10° in regard to the horizontal.

Any unit of elongated food product supported on the circular conveyor is urged towards the conveyor periphery, against the limitative wall, for example by centrifuge force when the circular conveyor rotates or by gravity if the circular conveyor is not horizontal and/or not flat. The centrifugal force and the gravity naturally orients the units of elongated food product with its longest longitude parallel to the conveyor periphery.

The limitative wall includes an extraction opening through which the centrifugal force expels the unitary elongated food products contained in the conveyor periphery when passing in front of said extraction opening. Because the units of elongated food product are oriented parallel to the conveyor periphery all the units expelled through said extraction opening have the same predefined orientation.

The units of elongated food product expelled from the circular conveyor through the extraction opening moves naturally in a lineal direction tangent to the conveyor periphery. The intake end of the extraction path is preferably tangent to the conveyor periphery and is connected to the extraction opening, so that said unitary elongated food product, following its natural inertial movement, are introduced in the intake end of the extraction path. Preferably guiding elements are placed between the extraction opening and the intake end of the extraction path to assure the correct displacement of the unitary elongated food products therethrough.

According to the proposed configuration, the circular wheel, which is vertical, and the first conveyor, which is partially supported on the wheel periphery and therefore its path is also contained in a vertical plane, have a small footprint which barely increases the footprint of the circular conveyor, permitting to transfer the units of elongated food product from a lower level, where said food product is accumulated in an unoriented manner on the circular conveyor, to a higher level where the outtake end of the extraction path delivers the units of elongated food product in an oriented manner.

So, the movement of the first conveyor reproduces the following sequence. First said first conveyor reaches the wheel periphery of the circular wheel in a certain point coincident with the start of the circular portion of the extraction path, then is supported on said wheel periphery covering circular groove entrance along all the longitude of the circular portion of the extraction path, later is separated from the wheel periphery at the end of the circular portion of the extraction path, then follows the rest of the extraction path downstream to the circular portion of the extraction path if exists and finally closes the loop returning to the starting point of this sequence.

The circular wheel and the circular conveyor are coordinated to produce the rotative movement of the circular periphery of the circular wheel at a higher velocity than the rotative movement of the conveyor periphery of the circular conveyor. This assures that the extraction of the unitary elongated food products is faster than their extraction from the circular conveyor, preventing undesired accumulations, and also assures that the unitary elongated food products are feed in the extraction path with a separation space in-between.

According to one embodiment of the present invention, the circular conveyor comprises concentric inner and outer regions rotating in substantially horizontal planes tilted to each other defining a raised portion of the outer region, placed above a portion of the inner region adjacent to the raised portion and the rest of the outer region being leveled or below a portion of the inner region adjacent thereto, the outer region defining the conveyor periphery and the extraction opening being coincident with the raised portion of the outer region.

The unitary elongated food products contained in the inner region will be urged towards the outer region and will enter in said outer region through the portion of the outer region of the circular conveyor leveled or below the inner region. Then the unitary elongated food products will be transported to the raised portion of the outer region, being separated from the rest of the unitary elongated food products contained in the inner region. Preferably the width of the outer region is substantially equal to the width of the unitary elongated food product, preferably with a maximal deviation from said measure of 20%, preventing the accumulation of more than one unitary elongated food products side by side on the outer region of the circular conveyor.

Preferably the inner region and the outer region rotate in the same direction and optionally at the same velocity.

According to an additional embodiment, the first conveyor further comprises a feeding portion comprised between the start of the circular portion of the extraction path and the extraction opening of the limitative wall, said feeding portion being preferably tangent to the wheel periphery and coplanar with or lower than the circular conveyor, so that when the unitary elongated food products are expelled through the extraction opening they fall on the feeding portion of the first conveyor which guide and transport the unitary elongated food portions to the circular portion of the extraction path.

Alternatively, the feeding portion is overlapped with the conveyor periphery of the circular conveyor and tangent to the wheel periphery.

The extraction path can also include a final portion comprised between the circular portion and the out-take end of the extraction path. Preferably said final portion will be horizontal or a downward slope to facilitate the transport of the unitary food products.

In another embodiment of the present invention, the extraction path further comprises a second conveyor parallel to the first conveyor, being the unitary food products retained and transported between said two parallel first and second conveyors.

The second conveyor is a conveyor belt equal or narrower than the bottom wall of the circular groove, and a circular portion of the second conveyor is directly supported on a portion of the bottom wall facing and parallel to the portion of the first conveyor supported on the wheel periphery, so that the extraction path is defined between two parallel conveyor belts. In will be understood that the both conveyor belts are parallel in the extraction path, but that each conveyor belt further comprises other sections which are not parallel to each other, such the return path of each conveyor belt which is not in contact with the unitary elongated food product.

According to this embodiment the second conveyor has a portion included within the circular groove, supported on the bottom wall on a portion of the circumference of the circular groove, defining the circular portion of the extraction path. The second conveyor further includes a portion not included within the circular groove defining other portions of the extraction path, such as the feeding portion or the final portion.

When the final portion is defined between the first and the second conveyors, said final portion can be an ascendant ramp tangent to the circular groove.

The movement of the second conveyor reproduces the following sequence. First said second conveyor introduces in the circular groove in a certain point of the wheel periphery through the circular groove entrance coincident with the start of the circular portion of the extraction path, then is supported on the bottom wall along all the longitude of the circular portion of the extraction path, later is extracted from the circular groove through the circular groove entrance at the end of the circular portion of the extraction path, then follows the rest of the extraction path downstream the circular portion of the extraction path parallel to the first conveyor and finally closes the loop returning to the starting point of this sequence.

Preferably the distance between the first and the second conveyors in the extraction path is equal to the thickness of the unitary elongated food products, said unitary elongated food products being trapped between said first and second conveyors.

It is also proposed to include an optic detector in the extraction device, said optic detector being configured to detect the number and/or longitude of the unitary elongated food products passing through the extraction path. For example, the optic detector can comprise a light emitter and a light receiver facing each other on opposed sides of the extraction path, detecting interruptions in the light emitted by the light emitter when a unitary food product pass between them. The angular rotation of the circular wheel produced during the interruption of the light, and measured by a rotation detector, is indicative of the longitude of the unitary food product.

Preferably the annular lateral walls of the circular groove, or all the circular wheel, are made of a material transparent or translucent to the light emitted by the light emitter and the light emitter and the light receiver are placed on each side of the circular wheel. This prevents the contamination of the optic detector and facilitates the cleaning operations.

The out-take end of the extraction path preferably includes multiple separated delivery positions. Then the extractor device will further include a diverging device to direct each unitary elongated food product conducted through the extraction path to one of said multiple delivery positions. This can be used for example to feed different packing lines, or to return some unitary elongated food products to the circular conveyor when the extractor device is delivering unitary elongated food products faster than the receiving capacity of a packing line, or to empty the unitary food products contained within the extraction path, among other uses.

Preferably the diverging device is coordinated with the optic detector to determine the delivery position of each unitary elongated food product in response to the measurements obtained by the optic detector. For example the diverging device can be used to classify the unitary food products depending on its longitude, can be used to discard unitary elongated food products too short or too long, or to return unitary elongated food products to the circular conveyor when certain number of unitary elongated food products have been already delivered by the extraction device.

For example, a control unit connected to the rotation detector, to the optic detector and to the diverging device will coordinate the activation of the diverging device when a particular unitary elongated food product detected by the optic detector reaches the out-take of the extraction path, that moment being calculated by the control unit considering the rotation of the circular wheel detected by the rotation detector.

The diverging device can include, for example, one or more deflecting flaps or deflecting pushers which are moveable between a rest position in which does not interfere with the extraction path and a deflecting position in which interfere at least partially with the extraction path for directing or pushing units of elongated food product out of the extraction path in a certain position.

According to an alternative embodiment the diverging device include one or more deflecting blowers which are configured to blow transversally to the extraction path for pushing units of elongated food product out of the extraction path.

According to an additional embodiment, the circular wheel comprises two lateral discs, each including one of the lateral annular walls of the circular groove, and one central disc retained between the two lateral discs which includes the bottom wall of the circular groove on the periphery thereof. The size of the circular groove can be adjusted by changing the central disc, adapting the dimensions of the extraction path to unitary elongated food products of different sizes. Increasing the width of the central disc increases the width of the extraction path and reducing the diameter of the central disc increases the height of the extraction path. Additional adjustments will be required on the first and second conveyors by adjustable means, such as to adjust the tension of the second conveyor if the diameter of the central disc is reduced, or adjusting the distance between the first and second conveyor on the feeding portion and/or on the final portion to match with the dimensions of the extraction path on the circular portion.

According to a second aspect, the present invention is directed to an operation method of the compact orienting and transferring device for unitary elongated food products described above.

The proposed method comprises the following steps, already known in the state of the art:
  feeding the unitary elongated food products to the intake end of the extraction path;
  transferring the unitary elongated food products from the intake end to the out-take end of the extraction path at a conveyance velocity determined by the velocity of the first conveyor and by the velocity of the circular periphery of the circular wheel on which the first conveyor is supported.

The circular periphery of the circular wheel and the first conveyor will move at the same velocity.

The proposed invention further includes the following steps, not known from the state of the art:
- the feeding step includes pouring the unitary elongated food products in bulk on the circular conveyor, and rotating the circular conveyor urging the unitary elongated food products against the conveyor periphery in an aligned succession against the limitative wall and transferring the unitary elongated food products from the conveyor periphery to the intake-end of the extraction path through the extraction opening; and wherein
- the conveyance velocity is higher than the velocity of the conveyor periphery of the circular conveyor preventing undesired accumulations and feeding the unitary elongated food products in the extraction path with a separation space in-between.

When the circular conveyor includes an inner region and an outer region, it is proposed to move the outer region faster than the inner region to produce a separation between the unitary elongated food products. This different velocity can be coordinated through a control unit.

It will be understood that references to geometric position, such as parallel, perpendicular, tangent, vertical or horizontal etc. allow deviations up to ±5° from the theoretical position defined by this nomenclature.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which:

FIG. 3 shows a vertical section of the compact orienting and transferring device coincident with the horizontal axis of the circular wheel;

FIG. 4 shows a zoomed view of the transversal section of the annular groove;

FIG. 5A shows a plan view of the diverging device on a rest position according to an embodiment in which the diverging device comprises deflecting flaps;

FIG. 5b shows a plan view of the diverging device shown on FIG. 5A but in a deflecting position;

FIG. 6A shows a plan view of the diverging device on a rest position according to an embodiment in which the diverging device comprises deflecting pushers;

FIG. 6B shows a plan view of the diverging device shown on FIG. 6A but in a deflecting position.

DETAILED DESCRIPTION OF AN EMBODIMENT

The foregoing and other advantages and features will be more fully understood from the following detailed description of an embodiment with reference to the accompanying drawings, to be taken in an illustrative and not limitative.

Figure 1:
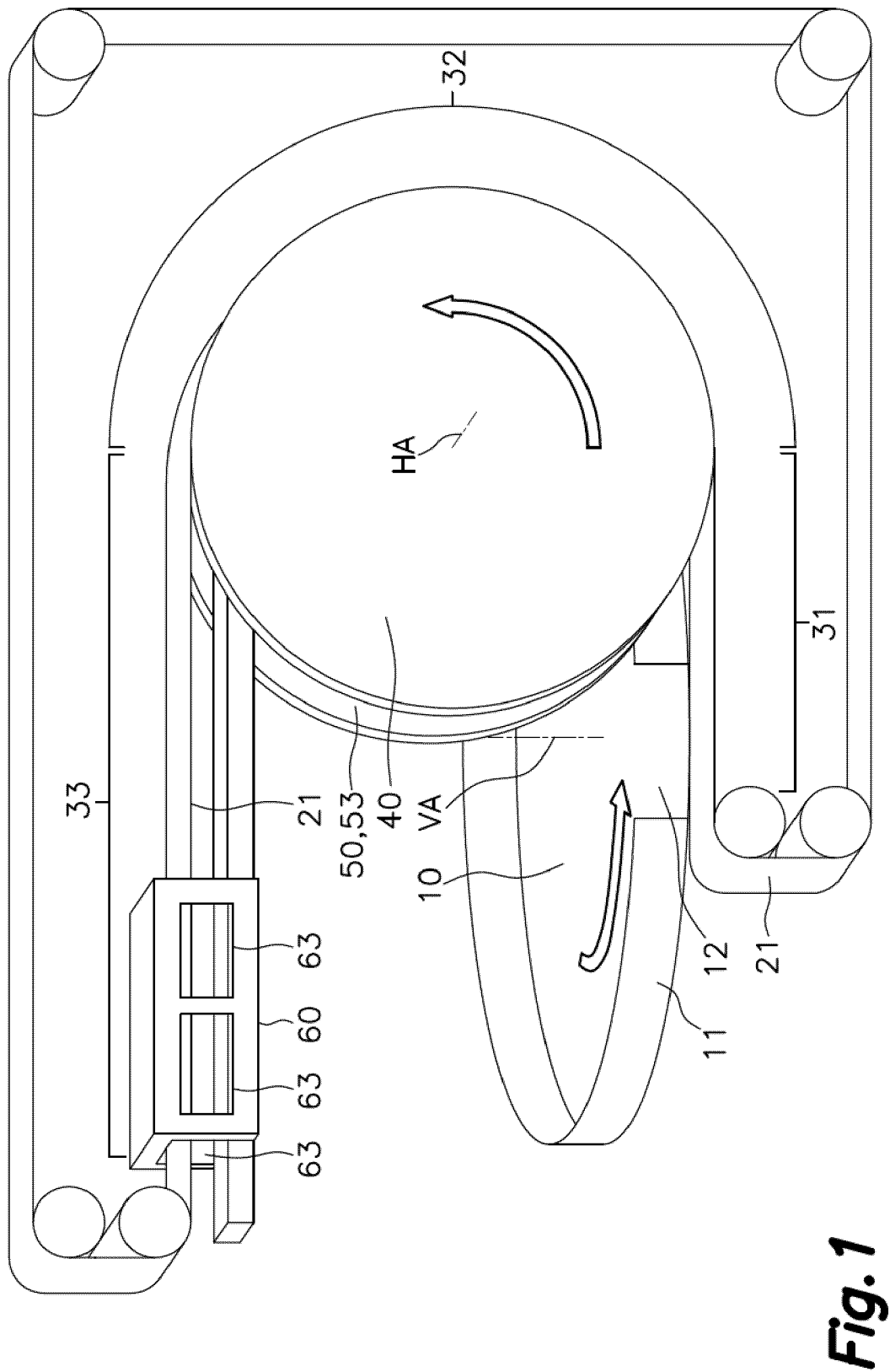
FIG. 1 shows a perspective view of the compact orienting and transferring device for elongated unitary food products according to a first embodiment in which the extraction path does not include a second conveyor belt.

According to a first embodiment shown on the FIG. 1 the present invention comprises a circular conveyor 10, which comprises a circular horizontal rotative disc surrounded by a cylindrical limitative wall 11 which includes a extraction opening 12, and an extractor device including a circular wheel 40 surrounded by a circular groove 50 and a first conveyor 21.

Figure 7:
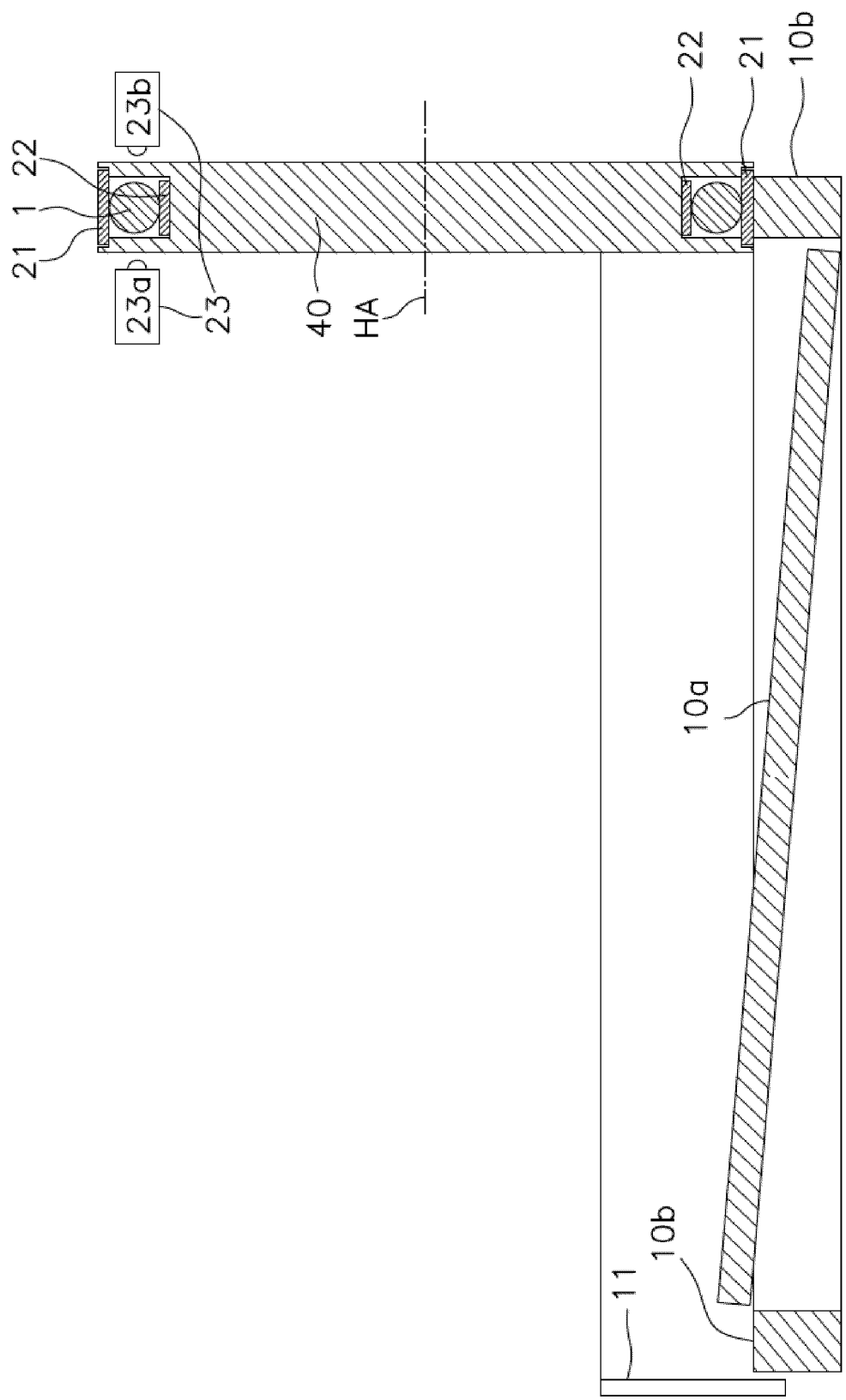
FIG. 7 shows a vertical section of the compact orienting and transferring device coincident with the horizontal axis of the circular wheel, according to an alternative embodiment of the circular conveyor, including concentric inner and an outer regions in substantially horizontal tilted planes.

According to an alternative embodiment shown on FIG. 7, the circular conveyor 10 comprises concentric inner and outer regions 10a, 10b rotating in substantially horizontal planes tilted to each other defining a raised portion of the outer region, placed above a portion of the inner region 10a adjacent of said raised portion. The rest of the outer region 10b being leveled or below a portion of the inner region 10a adjacent thereto, the outer region 10b defining the conveyor periphery and the extraction opening 12 being coincident with the raised portion of the outer region.

The circular groove 50, shown in detail on FIG. 4, includes one groove entrance 53, two lateral annular walls 51 facing each other, and a bottom wall 52 facing the groove entrance 53 and comprised between the two lateral annular walls 51.

The first conveyor 21 is a conveyor belt which includes, in the following order, a feeding portion 31, a circular portion 32 and a final portion 33 defining an extraction path, and also includes a returning portion which closes the loop. The feeding portion 31 is adjacent to the extraction opening 12 of the limitative wall 11, and is preferably horizontal and tangent to the conveyor periphery and at the same level or below the level of said conveyor periphery, and is also tangent to the wheel periphery. The circular portion 32 is downstream to the feeding portion 31 and is supported on the wheel periphery, covering the circular groove 50. The final portion 33 is downstream the circular portion 32 and is tangent to the wheel periphery.

When unitary elongated food products 1, for example sausages or frankfurts, are discharged onto the circular conveyor 10, the centrifugal force produced by the rotation of the circular conveyor 10 projects the unitary elongated food products 1 to the conveyor periphery, against the limitative wall 11.

When one of those unitary elongated food products 1 accumulated on the conveyor periphery reaches the extraction opening 12 the centrifugal force urges said unitary elongated food product 1 out of the circular conveyor 12, falling on the feeding portion 31 of the first conveyor 21, entering into the extraction path 31, 32, 33. Then the unitary elongated food product 1 is conveyed by the first conveyor 21 to the circular portion 32 of the extraction path, introducing the unitary elongated food product 1 into the circular groove 50 through a portion of the groove entrance 53 not covered by the first conveyor where the circular portion 32 of the extraction path starts. Then the unitary elongated food product 1 is transported along the circular portion 32 of the extraction path confined within the circular groove 50 by the rotational movement of the circular wheel 40 and the movement of the circular portion of the first conveyor 21 covering the groove entrance 53 of the circular groove 50.

When the unitary elongated food product 1 reaches the final portion 33 exits the circular groove 50 through a portion of the groove entrance 53 not covered by the first conveyor urged by the first conveyor. In this embodiment shown on FIG. 1 also a static platform parallel to the final portion 32 of the first conveyor 21 with one end introduced within the circular groove 50 guides the unitary elongated food product out of the circular groove 50. Optionally said static platform can be also a second conveyor parallel to the first conveyor only on the final portion 33 of the extraction path.

Figure 2:
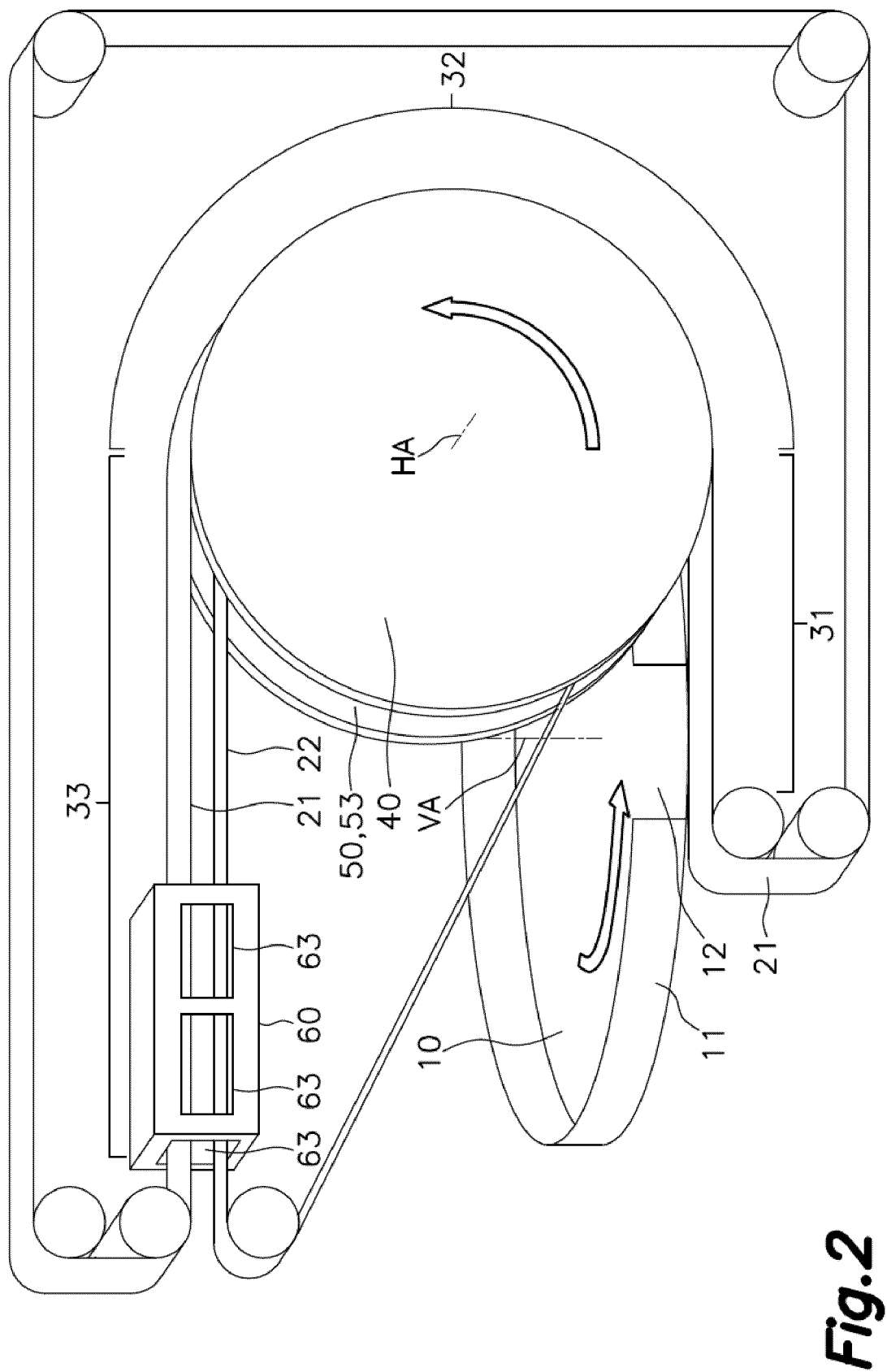
FIG. 2 shows a perspective view of the compact orienting and transferring device for elongated unitary food products according to a second embodiment in which the extraction path includes a first and a second conveyors parallel to each other.

According to an alternative embodiment shown on FIG. 2 the extraction device further comprises a second conveyor 22 which is narrower than the circular groove 50, shown in detail on FIG. 4. Said second conveyor 22 is a conveyor belt with a portion inserted within the circular groove through an uncovered portion of the groove entrance 53 and supported on the bottom wall 52 of the circular groove 50. Said portion of the second conveyor 22 supported on the bottom wall 52 is parallel to the portion of the first conveyor 21 supported on the periphery of the circular wheel 40, defining the circular portion 32 of the extraction path between them.

According to the present embodiment, the second conveyor 22 is also parallel to the first conveyor 21 along the final portion 33 of the extraction path, conveying the unitary elongated food products 1 out of the circular groove 50.

In both embodiments, the final portion 33 of the extraction path convey the unitary elongated food products to a diverging device 60 including multiple delivery positions 63 and which can deflect or push each unitary elongated food product to one of those delivery positions 63, using for example deflecting flaps 62, shown on FIGS. 5A and 5B, or deflecting pushers 62 shown on FIG. 6A and FIG. 6B, movable between a rest position in which they does not interfere with the extraction path, and a deflecting position in which interfere at least partially with the extraction path and with any unitary elongated food product 1 placed therein at that moment, forcing said unitary elongated food product 1 out of the extraction path into one selected delivery position 63.

Alternatively, the diverging device 60 can include deflecting blowers which can blow transversally to the extraction path, pushing any unitary elongated food product 1 placed on the extraction path in front of the deflecting blower out of the extraction path into one selected delivery position 63.

The extraction device can further comprise an optic detector 23 configured to detect the number and/or the longitude of the unitary elongated food products 1 passing through the extraction path.

As shown on FIG. 3, the optic detector 23 can include one light emitter 23a and one light receiver 23b facing each other on opposed sides of the extraction path. In the present embodiment they are on opposed sides of the circular wheel 40 facing the lateral annular walls 51 of the circular groove 50, which are made of a material transparent or translucent to the light emitted by the light emitter 23a. When a unitary elongated food product 1 interrupts the light beam its presence is detected.

The displacement produced by the first conveyor 21, the second conveyor 22 or the angular rotation of the circular wheel 40 during the light beam interruption time is indicative of the longitude of the unitary elongated food product 1 detected by the optic detector 23.

In the present embodiment it is proposed to include a circular wheel rotation detector to determine the rotational velocity of said circular wheel 40. Using this information, a control device can calculate the longitude and position of each single unitary elongated food product contained in the extraction path downstream the optic detector 23. Said control unit can also control the diverging device 60 to determine the delivery position 63 of each single unitary elongated food product 1.

The invention claimed is:

1. Compact orienting and transferring device for unitary elongated food products comprising:
   an extractor device including an extraction path, defined on a first conveyor, with an intake end for receiving unitary elongated food products and an out-take end for delivering the unitary elongated food products,
   the extractor device further comprises a circular wheel, rotative around a horizontal axis, defining a wheel periphery and including a circular groove on the wheel periphery defined between two lateral annular walls facing each other and one bottom wall comprised between the two lateral annular walls and facing a circular groove entrance which surrounds the circular wheel;
   the first conveyor is a conveyor belt wider than the circular groove entrance defined between the two lateral annular walls of the circular groove, and a circular portion of the first conveyor is directly supported on the wheel periphery covering the circular groove entrance on a portion of that wheel periphery, defining a circular portion of the extraction path within the circular groove between the bottom wall of the circular groove and the portion of the first conveyor covering the circular groove;
   a circular conveyor, rotative in a substantially horizontal plane, defining a conveyor periphery surrounded by a limitative wall, the limitative wall including an extraction opening connected to the intake-end of the extraction path adjacent to the conveyor periphery; and
   the circular wheel and the circular conveyor are coordinated through a control unit to produce the rotative movement of the circular periphery of the circular wheel at a higher velocity than the rotative movement of the conveyor periphery of the circular conveyor.

2. The compact orienting and transferring device according to claim 1 wherein the circular conveyor comprises concentric inner and outer regions rotating in substantially horizontal planes tilted to each other defining a raised portion of the outer region, placed above a portion of the inner region adjacent to the raised portion and the rest of the outer region being leveled or below a portion of the inner region adjacent thereto, the outer region defining the conveyor periphery and the extraction opening being coincident with the raised portion of the outer region.

3. The compact orienting and transferring device according to claim 1 wherein the extraction path further comprises a feeding portion comprised between the extraction opening of the limitative wall and the start of the circular portion of the extraction path.

4. The compact orienting and transferring device according to claim 3 wherein the feeding portion is coplanar with or lower than the conveyor periphery of the circular conveyor and tangent to the wheel periphery.

5. The compact orienting and transferring device according to claim 3 wherein the feeding portion is overlapped with the conveyor periphery of the circular conveyor and tangent to the wheel periphery.

6. The compact orienting and transferring device according to claim 1 wherein the extraction path further includes a final portion comprised between the circular portion and the out-take end of the extraction path.

7. The compact orienting and transferring device according to claim 1 wherein the extraction path further comprises a second conveyor parallel to the first conveyor, the second conveyor being a conveyor belt equal or narrower than the bottom wall of the circular groove, a circular portion of the second conveyor being directly supported on a portion of the bottom wall facing and parallel to the portion of the first conveyor supported on the wheel periphery.

8. The compact orienting and transferring device according to claim 7 wherein the out-take end of the extraction path includes multiple separated delivery positions, and the extractor device further includes a diverging device to direct each unitary elongated food product conducted through the extraction path to one of the multiple delivery positions.

9. The compact orienting and transferring device according to claim 8 wherein the diverging device is in coordination with the optic detector to determine the delivery position of each unitary elongated food product in response to the measurements obtained by the optic detector.

10. The compact orienting and transferring device according to claim 1 wherein the extractor device further comprises an optic detector configured to detect the number and/or longitude of the unitary elongated food products passing through the extraction path.

11. The compact orienting and transferring device according to claim 10 wherein the optic detector comprises a light emitter and a light receiver facing each other on opposed sides of the extraction path.

12. The compact orienting and transferring device according to claim 11 wherein the annular lateral walls of the circular groove are made of a material transparent or translucent and the light emitter and the light receiver are placed on opposed sides of the circular wheel.

13. The compact orienting and transferring device according to claim 1 wherein the out-take end of the extraction path includes multiple separated delivery positions, and the extractor device further includes a diverging device to direct each unitary elongated food product conducted through the extraction path to one of the multiple delivery positions.

14. The compact orienting and transferring device according to claim 13 wherein the diverging device include one or more deflecting flaps or deflecting pushers which are moveable between a rest position in which does not interfere with the extraction path and a deflecting position in which interfere at least partially with the extraction path for directing or pushing unitary elongated food products to selected delivery positions.

15. The compact orienting and transferring device according to claim 13 wherein the diverging device include one or more deflecting blowers which are configured to blow transversally to the extraction path for pushing unitary elongated food products to selected delivery positions.

16. The compact orienting and transferring device according to claim 1 wherein the circular wheel comprises two lateral discs, each including one of the lateral annular walls of the circular groove, and one central disc retained between the two lateral discs which includes the bottom wall of the circular groove on the periphery thereof.

17. An operation method of a compact orienting and transferring device for unitary elongated food products, the method comprising:
feeding unitary elongated food products to an intake end of an extraction path;
transferring the unitary elongated food products from the intake end to an out-take end of the extraction path at a conveyance velocity determined by a velocity of a first conveyor and by a velocity of a circular periphery of a circular wheel on which the first conveyor is supported;
wherein
a feeding step includes pouring the unitary elongated food products in bulk on a circular conveyor, and rotating the circular conveyor urging the unitary elongated food products against a periphery of the circular conveyor in an aligned succession against a limitative wall and transferring the unitary elongated food products from the periphery of the circular conveyor to the intake-end of the extraction path through an extraction opening; and
the conveyance velocity is higher than the velocity of the periphery of the circular conveyor preventing undesired accumulations and feeding the unitary elongated food products in the extraction path with a separation space in-between.

* * * * *